(12) United States Patent
Mahendrakar

(10) Patent No.: US 12,299,431 B2
(45) Date of Patent: May 13, 2025

(54) UPGRADING FIRE PANEL FIRMWARE USING MACHINE LEARNING

(71) Applicant: Honeywell International Inc., Charlotte, NC (US)

(72) Inventor: Guruprasad Vishvanath Mahendrakar, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 277 days.

(21) Appl. No.: 17/578,929

(22) Filed: Jan. 19, 2022

(65) Prior Publication Data

US 2023/0229418 A1 Jul. 20, 2023

(51) Int. Cl.
*G06F 8/65* (2018.01)
*G06F 11/36* (2006.01)
*G06F 11/3668* (2025.01)

(52) U.S. Cl.
CPC ............ *G06F 8/65* (2013.01); *G06F 11/3688* (2013.01); *G06F 11/3692* (2013.01)

(58) Field of Classification Search
CPC ... G06F 8/60; G06F 8/61; G06F 11/36; G06F 11/3688
See application file for complete search history.

(56) References Cited

U.S. PATENT DOCUMENTS

| | | | |
|---|---|---|---|
| 6,289,331 B1 | 9/2001 | Pedersen et al. | |
| 10,455,416 B2 | 10/2019 | Nalukurthy et al. | |
| 10,830,817 B2 | 11/2020 | Raman et al. | |
| 11,036,608 B2 | 6/2021 | Desikachari et al. | |
| 2015/0220318 A1* | 8/2015 | Mangaiahgari | G06F 8/62 717/172 |
| 2019/0073292 A1* | 3/2019 | Kuppusamy | G06F 11/3672 |
| 2020/0285569 A1 | 9/2020 | Tung et al. | |
| 2021/0096981 A1 | 4/2021 | Desikachari et al. | |
| 2023/0282096 A1* | 9/2023 | Kunze | G08B 29/043 340/577 |

FOREIGN PATENT DOCUMENTS

DE 102017214075 A1 2/2019
EP 3447636 A1 2/2019

OTHER PUBLICATIONS

Sofy., "Automatic Test Case Generation Using Machine Learning"; May 24, 2021 (7 pgs).

(Continued)

*Primary Examiner* — Duy Khuong T Nguyen
(74) *Attorney, Agent, or Firm* — Brooks, Cameron & Huebsch, PLLC

(57) ABSTRACT

Devices, systems, and methods for upgrading fire panel firmware using machine learning are described herein. In some examples, one or more embodiments include a fire panel comprising a processor and a memory having instructions stored thereon which, when executed by the processor, cause the processor to collect operational data associated with a fire system controlled by the fire panel device over a period of time while the fire panel device utilizes a first firmware version, determine a plurality of test cases based on the operational data, execute the plurality of test cases while the fire panel device utilizes a second firmware version, and provide results of each of the plurality of executed test cases via an interface.

16 Claims, 4 Drawing Sheets

(56) References Cited

OTHER PUBLICATIONS

World Scientific: Connecting Great Minds, "Smart Fire Detection System with Early Notifications Using Machine Learning"; International Journal of Computational Intelligence and Applications; vol. 16, No. 02, May 26, 2017 (Abstract; 2 pgs).

Servadei, et al., "Using Machine Learning for Predicting Area and Firmware Metrics of Hardware Designs From Abstract Specifications"; Microprocessors and Microsystems, vol. 71, Nov. 2019 (Abstract; 3 pgs).

* cited by examiner

COLLECTING OPERATIONAL DATA ASSOCIATED WITH A FIRE SYSTEM BY A FIRE PANEL DEVICE OVER A PERIOD OF TIME WHILE THE FIRE PANEL DEVICE UTILIZES A FIRST FIRMWARE VERSION STORED IN A FIRST PORTION OF A MEMORY OF THE FIRE PANEL DEVICE
446

LEARNING OPERATIONAL CHARACTERISTICS ASSOCIATED WITH THE FIRE PANEL DEVICE UTILIZING THE FIRST FIRMWARE VERSION
448

DETERMINING A PLURALITY OF TEST CASES FOR A SECOND FIRMWARE VERSION BASED ON THE OPERATIONAL CHARACTERISTICS
450

RECEIVING THE SECOND FIRMWARE VERSION AND STORING THE SECOND FIRMWARE VERSION IN A SECOND PORTION OF THE MEMORY
452

RESPONSIVE TO LOADING THE SECOND FIRMWARE VERSION FROM THE SECOND PORTION OF THE MEMORY, EXECUTING THE PLURALITY OF TEST CASES WHILE THE FIRE PANEL DEVICE UTILIZES THE SECOND FIRMWARE VERSION
454

PROVIDING RESULTS OF EACH OF THE PLURALITY OF EXECUTED TEST CASES VIA AN INTERFACE
456

FIG. 4

UPGRADING FIRE PANEL FIRMWARE USING MACHINE LEARNING

TECHNICAL FIELD

The present disclosure relates to devices, systems, and methods for upgrading fire panel firmware using machine learning.

BACKGROUND

Large facilities (e.g., buildings), such as commercial facilities, office buildings, hospitals, and the like, may have an alarm system that can be triggered during an emergency situation (e.g., a fire) to warn occupants to evacuate. For example, an alarm system may include a fire panel (e.g., a fire control panel) and a plurality of event devices (e.g., hazard sensing devices, input devices, output devices, etc.) located throughout the facility (e.g., on different floors and/or in different rooms of the facility) that can perform an action when a hazard event is occurring in the facility and provide a notification of the hazard event to the occupants of the facility via alarms or other mechanisms.

BRIEF DESCRIPTION OF THE DRAWINGS

FIG. 4 illustrates a method for upgrading fire panel firmware using machine learning in accordance with one or more embodiments of the present disclosure.

DETAILED DESCRIPTION

Figure 1:
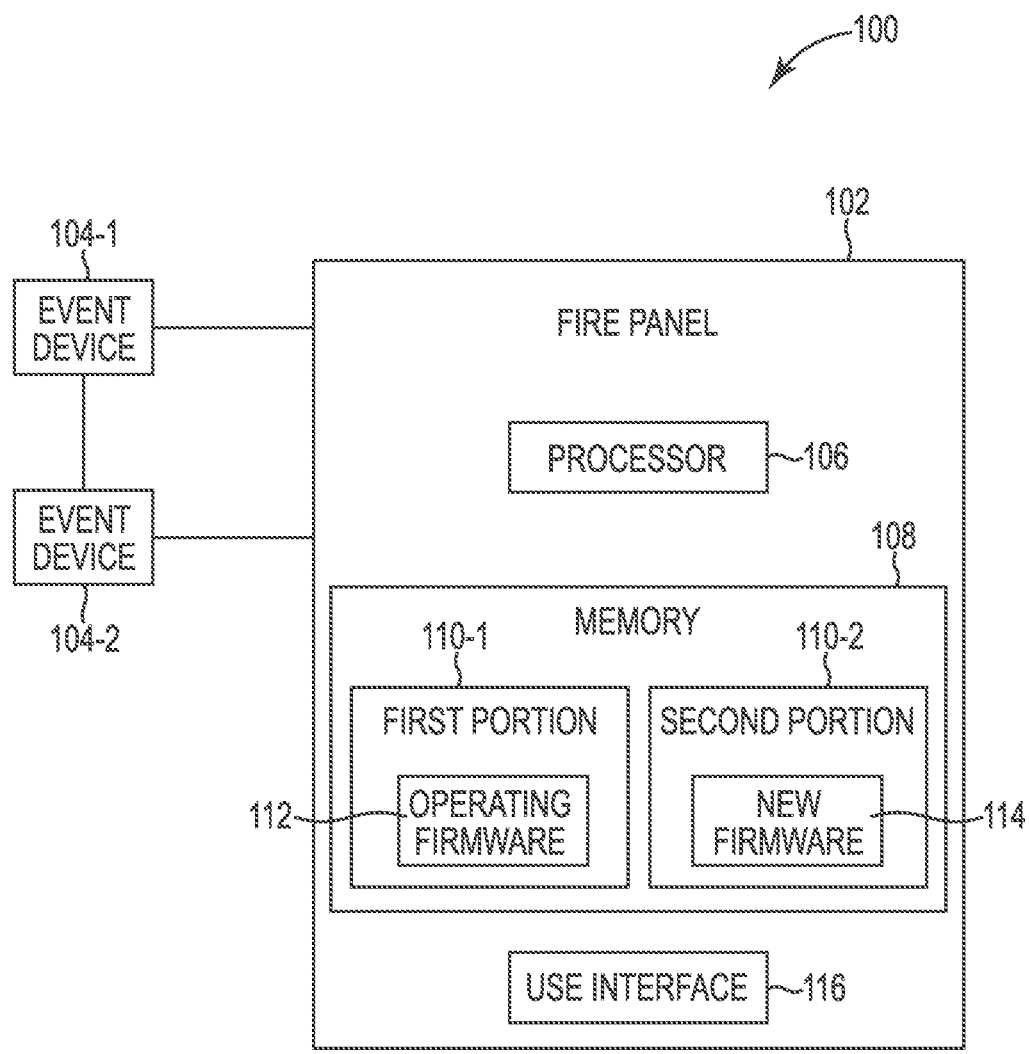
FIG. 1 is an example of a system for upgrading fire panel firmware using machine learning in accordance with one or more embodiments of the present disclosure.

Devices, systems, and methods for upgrading fire panel firmware using machine learning are described herein. In some examples, one or more embodiments include a fire panel comprising a processor and a memory having instructions stored thereon which, when executed by the processor, cause the processor to collect operational data associated with a fire system controlled by the fire panel device over a period of time while the fire panel device utilizes a first firmware version, determine a plurality of test cases based on the operational data, execute the plurality of test cases while the fire panel device utilizes a second firmware version, and provide results of each of the plurality of executed test cases via an interface.

A fire panel may be connected to various event devices located throughout a facility to comprise an alarm system in the facility. The fire panel can receive information from event devices, process the information, and transmit other information accordingly. For example, the fire panel of a facility may receive information from an event device in the facility and determine, based on predetermined logical functions, whether an emergency event such as a fire event is occurring in the facility based on such received information. Further, in other examples, the fire panel may provide for automatic control of equipment in response to detection of an event in the facility, as well as monitor operational integrity of such event devices, among other functions.

Fire panels may undergo a firmware upgrade. For example, a fire panel may be upgraded with new firmware. However, existing fire panels may not be intelligent enough to predict how the new firmware will perform in actual use. Under previous approaches, fire panels may lack the capability to validate if newly upgraded firmware will perform like the previous firmware that was in use before the upgrade. It is noted that the terms "new" and/or "upgraded" firmware may be used interchangeably herein in contrast to "previous" and/or "existing" firmware, which may generally be referred to herein as "operating firmware." Those of ordinary skill in the art will understand that a firmware upgrade involves replacing an existing operating firmware with a different firmware that may provide enhanced and/or different functionality than the existing firmware.

In some previous approaches, testing of new firmware is done on engineering sites that have limited hardware setup and minimal knowledge of real fire system installations in real facilities. As a result, it is difficult for these approaches to predict the suitability of the new firmware for a particular facility environment. Some approaches test newly-added and existing firmware features with manual test cases. Some approaches test newly-added and existing firmware features with manual and automated test cases. Simulation techniques may be used to simulate a large number of devices but often do not reflect real configurations present in facilities. Accordingly, when a new firmware upgrade is scheduled at a facility, there may be no upfront feedback available to the installer on the suitability of the new firmware in the upgraded system or environment.

Embodiments of the present disclosure can predict the suitability of new firmware in a facility using data gathered, and analysis performed, by the operating firmware over a time period. The new firmware can determine whether it is capable of running in the fire control system as configured, and whether it can work efficiently and in compliance with legal regulations.

In some embodiments, for instance, the operating firmware can learn about its environment by gathering data from connected modules, sensors, devices, etc. This "leaning phase" can include the operating firmware determining how its current configuration is working within the facility, determining application-related parameters, determining frequently used features, and/or executing self-diagnostics on memory and/or central processing unit (CPU) utilization. The operating firmware can generate test cases using the gathered data. The operating firmware can execute the test cases to set benchmarks and/or expected results for the new firmware. The new firmware can execute the test cases to determine (e.g., predict) its suitability for the particular facility. The new firmware can provide feedback via an interface to a user regarding any discrepancies between predicted performance of the new firmware and the observed performance of the operating firmware.

As a result, installers can be more informed regarding whether the new firmware will indeed perform as desired in their particular facilities. In cases where a new firmware is determined to be unsuitable for a particular facility, installers can roll back and continue to rely on their existing operating firmware without the need to blindly gamble on a firmware upgrade performing as desired.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 302 in FIG. 3.

As used herein, "a", "an", or "a number of" something can refer to one or more such things, while "a plurality of" something can refer to more than one such things. For example, "a number of components" can refer to one or more components, while "a plurality of components" can refer to more than one component.

FIG. 1 is an example of a system 100 for upgrading fire panel firmware using machine learning in accordance with one or more embodiments of the present disclosure. The system 100 can include a fire panel 102 in communication (e.g., wired and/or wireless communication) with event devices 104-1, 104-2 (referred to collectively herein as event devices 104). It is noted that while two event devices are illustrated in the example shown in FIG. 1, embodiments of the present disclosure are not limited to a particular number of event devices.

The fire panel 102 can receive information from the event devices 104, process the information, and transmit other information accordingly. For example, the fire panel 102 may receive information from one or more of the event devices 104 in the facility and determine, based on predetermined logical functions, whether an emergency event such as a fire event is occurring in the facility based on such received information. Further, in other examples, the fire panel 102 may provide for automatic control of equipment in response to detection of an event in the facility, as well as monitor operational integrity of such event devices, among other functions.

As illustrated in FIG. 1, the event devices 104 can be included in a facility and can be connected to each other. As used herein, the term "event device" refers to a device that can receive an input relating to an event and/or generate an output relating to an event. Such an event can be, for instance, a hazard event such as a fire. For example, an event device 104-1, 104-2 can receive an input relating to a fire occurring in the facility. Such event devices 104 can be a part of an alarm system of the facility and can include devices such as fire sensors, smoke detectors, heat detectors, carbon monoxide (CO) detectors, or combinations of these; interfaces; manual call points (MCPs); pull stations; input/output modules; aspirating units; and/or audio/visual devices (e.g., speakers, sounders, flashers, buzzers, microphones, cameras, video displays, video screens, etc.), relay output modules, among other types of event devices.

Event devices 104 can be located in different areas of a facility. For example, the event device 104-1 may be located on a first floor of the facility, the event device 104-2 may be located on a second floor of the facility, etc. Further, event devices 104 may cover logical zones of the facility. As used herein, the term "logical zone" refers to an electronically defined area that corresponds to a physical area. A logical zone can correspond to a particular area of a facility, a portion of an area of the facility, etc. For example, a first logical zone may correspond to the first floor of the facility and be covered by the first event device 104-1, a second logical zone may correspond to the second floor of the facility and be covered by the second event device 104-2, etc. However, examples of the disclosure are not so limited. For example, the first logical zone may correspond to a first portion of the first floor of the facility and be covered by the first event device 104-1, the second logical zone may correspond to a second portion of the first floor of the facility and be covered by the second event device 104-2, etc. In other words, a logical zone may cover an entire area of a facility, a portion of the area of the facility, etc. Further, certain event devices may share the same logical zone (e.g., logical zones may overlap each other). For example, the event device 104-1 and the event device 104-2 may be associated with the same, or portions of the same, logical zone.

The event devices 104 can be associated with an area of the facility for monitoring for and detection of events. If an event such as a fire occurs in the area, one or more of the event devices 104 can detect the event. For example, the event device 104-1 may be a smoke detector that detects the presence of smoke in the area associated with the event device 104-1. The event device 104-1 can wirelessly transmit a notification of the detected event and location information associated with the event device 104-1 to the fire panel 102 and/or the event device 104-2. The notification can include information (e.g., data) indicating to the fire panel 102 and/or event device 104-2 that the event is detected by the event device 104-1.

The event devices 104 can be in wireless communication with each other via a network relationship. In some examples, the network relationship can be a wireless mesh network. As used herein, the term "wireless mesh network" refers to a communication network made up of nodes organized in a mesh topology. The nodes making up the wireless mesh network can be, for example, the event devices 104. That is, each of the event devices 104 include wireless transmitters and/or receivers in order to transmit and/or receive information between each other via the wireless mesh network. In some examples, the wireless mesh network is a radio frequency (RF) mesh network.

Although the network relationship described above includes a wireless mesh network, embodiments of the present disclosure are not so limited. For example, the network relationship can be any other wired or wireless network relationship. Examples of such a network relationship can include a local area network (LAN), wide area network (WAN), personal area network (PAN), a distributed computing environment (e.g., a cloud computing environment), storage area network (SAN), Metropolitan area network (MAN), a cellular communications network, Long Term Evolution (LTE), visible light communication (VLC), Bluetooth, Worldwide Interoperability for Microwave Access (WiMAX), Near Field Communication (NFC), infrared (IR) communication, Public Switched Telephone Network (PSTN), radio waves, and/or the Internet, among other types of network relationships.

As illustrated in FIG. 1, the fire panel 102 can include a user interface 116. For example, the user interface 116 can display various screens and/or menus associated with managing the system 100 in accordance with the present disclosure.

A user (e.g., operator) of the fire panel 102 can interact with the fire panel 102 via user interface 116. For example, user interface 116 can provide (e.g., display and/or present) information to the user of the fire panel 102, and/or receive information from (e.g., input by) the user of the fire panel 102. For instance, in some embodiments, user interface 116 can be a graphical user interface (GUI), that can include a display (e.g., screen) that can provide and/or receive information to and/or from the user of the fire panel 102. The user interface 116 can be, for instance, a touchscreen (e.g., the GUI can include touchscreen capabilities). Alternatively, the user interface 116 can be a television, computer monitor, mobile device screen, other type of display device, or any combination thereof, connected to the fire panel 102 and configured to receive a video signal output from the fire panel 102.

As an additional example, user interface 116 can include a keyboard and/or mouse the user can use to input information into the fire panel 102, and/or a speaker that can play audio to, and/or receive audio (e.g., voice input) from the user. Embodiments of the present disclosure, however, are not limited to a particular type(s) of user interface.

The fire panel 102 can include a processor 106 and a memory 108. The memory 108 can be any type of storage medium that can be accessed by the processor 106 to perform various examples of the present disclosure. For example, the memory 108 can be a non-transitory computer readable medium having computer readable instructions (e.g., executable instructions/computer program instructions) stored thereon that are executable by the processor 106 for upgrading fire panel firmware using machine learning in accordance with the present disclosure.

The memory 108 can be volatile or nonvolatile memory. The memory 108 can also be removable (e.g., portable) memory, or non-removable (e.g., internal) memory. For example, the memory 108 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 108 is illustrated as being located within the fire panel 102, embodiments of the present disclosure are not so limited. For example, memory 108 can also be located internal to another computing resource (e.g., enabling computer readable instructions to be downloaded over the Internet or another wired or wireless connection).

The memory can include a first portion 110-1 and a second portion 110-2. The first portion 110-1 can be a first partition of the memory 108 and the second portion 110-2 can be a second partition of the memory 108, in some embodiments. As shown in FIG. 1, the first portion can include operating firmware 112. The operating firmware 112 can be executing to govern one or more operations of the fire panel 102. The second portion can include new firmware 114. The new firmware 114 can be received by the second portion from an external memory device, for instance, such as a universal serial bus (USB) flash drive.

Figure 2:
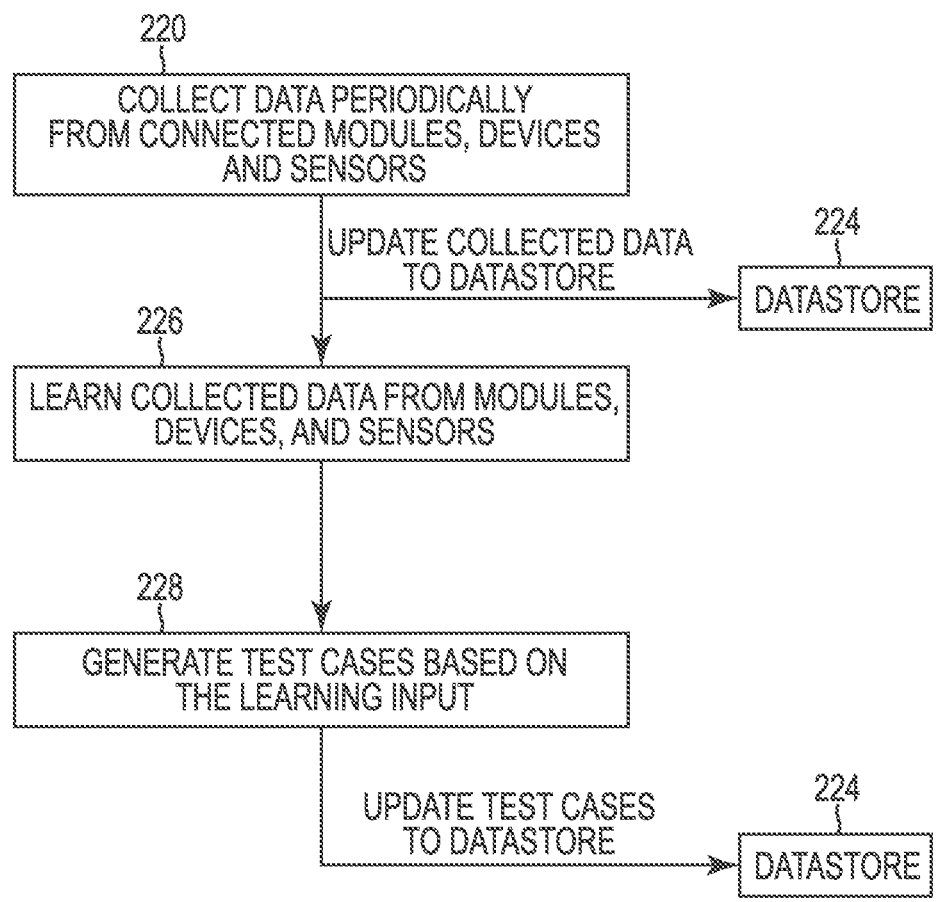
FIG. 2 is a flow chart associated with a data acquisition and learning portion of upgrading fire panel firmware using machine learning, in accordance with one or more embodiments of the present disclosure.

FIG. 2 is a flow chart associated with a data acquisition and learning portion of upgrading fire panel firmware using machine learning, in accordance with one or more embodiments of the present disclosure. In some embodiments, the steps of the flow chart illustrated in FIG. 2 can be performed by the operating firmware, previously described in connection with FIG. 1. At 220, data is collected periodically from connected modules, devices, and sensors. The connected modules, devices, and sensors can be one or more of the event devices 104, previously described in connection with FIG. 1. The collected data can be added to a datastore (e.g., a database, file, etc.) 224.

At 226, some embodiments can perform learning on the data collected from the modules, devices, and sensors. In some embodiments, a user can configure what is to be learned as input. For example, a user can indicate that CPU and/or memory consumption by applications executed by the fire panel during particular events is to be determined. The operating firmware can learn CPU and/or memory consumption by each of a plurality of firmware applications during certain events. In some embodiments, learning can include learning how an applied configuration is working. For example, embodiments herein can determine how outputs are triggered on certain events based on the configuration (e.g., cause and effect (CNE) logic). In some embodiments, learning can include learning application parameters. For example, embodiments herein can periodically gather values read from particular analog sensors and determine a range of such analog values. In some embodiments, embodiments of the present disclosure can learn on its own. For example, some embodiments can include learning a list of features or displays that are frequently used by a user or whose use exceeds a use threshold. Such features can include control operations performed by the user, particular menu screens accessed by the user At 228, test cases are generated based on the learning input. The generated test cases can be stored in the databases 224. As discussed above, the operating firmware can learn CPU and/or memory consumption by each of a plurality of firmware applications during certain events. Embodiments herein can create test cases with expected results of running those test cases based on this observation. Stated differently, embodiments herein can learn about the flow of data when particular events are triggered (e.g., what event data is transferred between firmware applications and their associated timings). Test cases can be created to test CNE logic and/or CNE data flow. Test cases can be created to test the valid range for each of a plurality of sensors. Test cases can be created to test list(s) of features frequently used by the user, including control operations, menu screens frequently accessed, and/or user interface features which get executed on their own. An example of the expected results of the test cases can include a high burst of data upon the occurrence of a particular event (e.g., a fire in a certain location).

Figure 3:
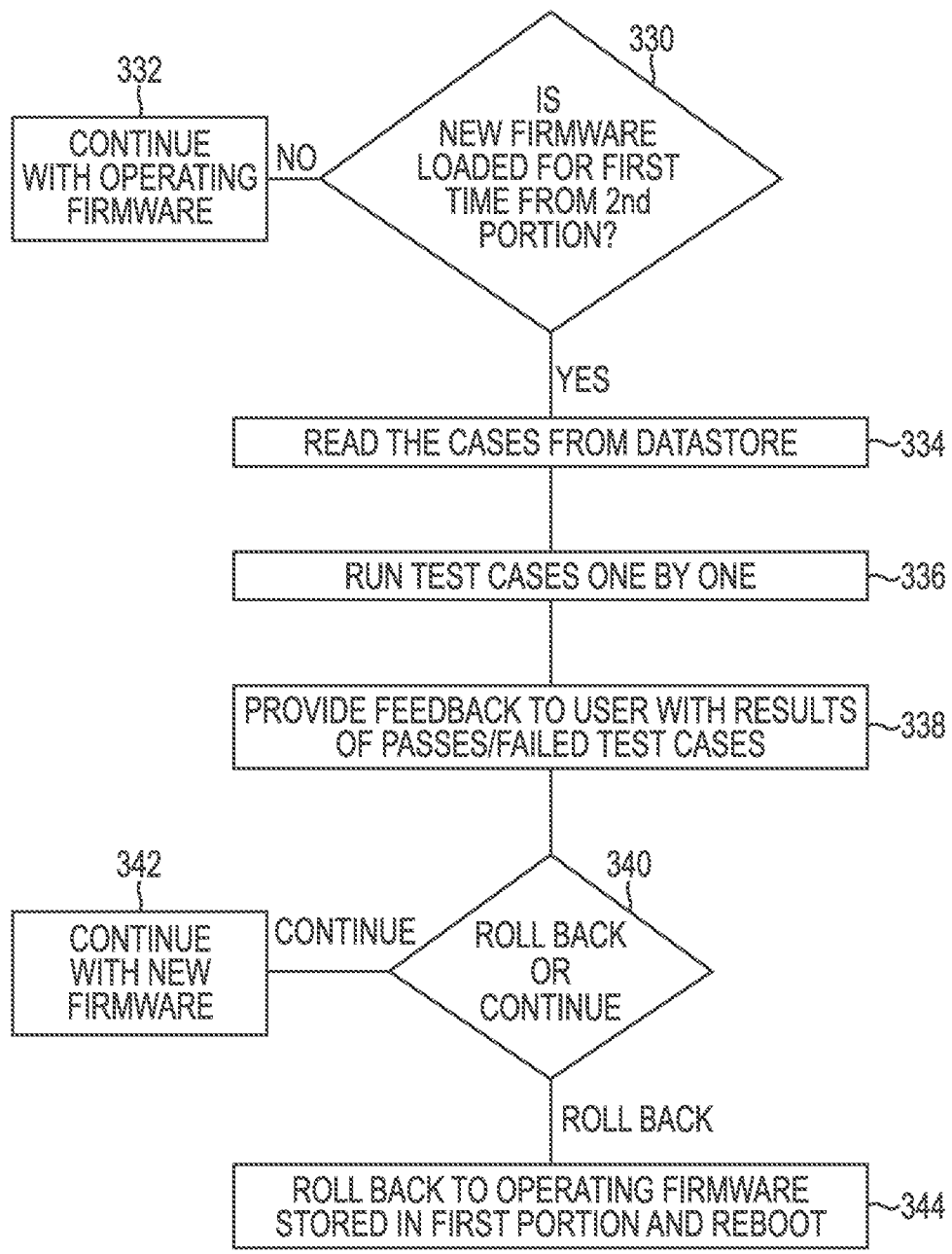
FIG. 3 is a flow chart associated with a prediction and notification portion of upgrading fire panel firmware using machine learning, in accordance with one or more embodiments of the present disclosure.

FIG. 3 is a flow chart associated with a prediction and notification portion of upgrading fire panel firmware using machine learning, in accordance with one or more embodiments of the present disclosure. In some embodiments, the steps of the flow chart illustrated in FIG. 3 can be performed by the new firmware, previously described in connection with FIG. 1. At 330, a determination is made regarding whether the new firmware has been loaded for the first time from the second portion of the memory (previously described in connection with FIG. 1). If not, then the operating firmware will continue to execute.

If the new firmware has been loaded for the first time from the second portion of the memory, then the test cases are read from the data store at 334 and executed (e.g., run) one-by-one, at 336. In some embodiments, the new firmware can perform the test cases using simulated events. In some embodiments, the new firmware simulates the behavior inside the fire panel without triggering any real outputs and determines if applications of the fire panel performed as expected, and if the new firmware is executing within design and/or regulatory compliance parameters. In some embodiment, the new firmware reads values from particular analog sensors and determines whether those values are within the range(s) determined by the operating firmware. In some embodiments, the new firmware can determine whether frequently used features and/or displays of the operating firmware are present in the new firmware, and whether those features and/or displays are reachable by the same (or similar) means.

Feedback can be provided at 338 in the form of results of the test cases. In some embodiments results can include an indication of a "pass" or a "fail" for each test case. In some embodiments, the feedback is a comparison chart illustrating how the new firmware is performing compared to the past performance of the operating firmware with respect to timing, CPU and/or memory utilization, and/or deviation(s) in data flow path with respect to the operating firmware when particular events are triggered. In some embodiments, feedback includes areas where the new firmware improves upon the operating firmware. For example, if the new firmware does not determine a high burst of data associated with a particular event when the operating firmware did, embodiments herein can provide positive feedback. In some embodiments, the feedback includes a notification of differences in the values from analog sensors received by the new firmware and the range(s) of those sensors determined by the operating firmware. In some embodiments, the new firmware can provide a notification when it is unable to locate frequently used features and/or displays available on the operating firmware. In some embodiments, the new firmware can provide a notification when those features and/or displays are not reachable by the same (or similar) means.

At 340, a notification is made to a user regarding whether to roll back to the operating firmware or continue with the new firmware. The user, based on the results of the test case can make such a determination. In some embodiments, the determination can be made automatically (e.g., without user input). Such embodiments may be limited to instances where no (or very few) test cases failed, for instance. If the user indicates the new firmware, the new firmware replaces the operating firmware and the panel executes the new firmware at 342. If the user indicates the operating firmware, embodiments herein can roll back to the operating firmware and reboot the fire panel at 344.

FIG. 4 illustrates a method for upgrading fire panel firmware using machine learning in accordance with one or more embodiments of the present disclosure. At 446, the method includes collecting operational data associated with a fire system by a fire panel device over a period of time while the fire panel device utilizes a first firmware version stored in a first portion of a memory of the fire panel device.

At 448, the method includes learning operational characteristics associated with the fire panel device utilizing the first firmware version. Learning operational characteristics can include learning a plurality of user interface features that exceed a user interaction threshold. The user interface features can include control operations performed by a user and/or menu displays accessed by the user, for instance.

At 450, the method includes determining a plurality of test cases for a second firmware version based on the operational characteristics. The test cases can include test cases and expected results of the test cases. At 452, the method includes receiving the second firmware version and storing the second firmware version in a second portion of the memory.

At 454, the method includes responsive to loading the second firmware version from the second portion of the memory, executing the plurality of test cases while the fire panel device utilizes the second firmware version. Executing the plurality of test cases can include simulating a plurality of events, determining a data flow path associated with the events, and determining a deviation in the data flow path from a data flow path determined while the fire panel device utilized the first firmware version, for instance.

At 456, the method includes providing results of each of the plurality of executed test cases via an interface. Providing results can include providing an indication of a passage or a failure of each of the plurality of test cases, for instance.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A fire panel device, comprising:
    a processor; and
    a memory having instructions stored thereon which, when executed by the processor, cause the processor to:
        collect operational data associated with a fire system controlled by the fire panel device over a period of time while the fire panel device utilizes a first firmware version stored in a first portion of the memory;
        learn operational characteristics associated with the fire panel device while the fire panel device utilizes the first firmware version, wherein learning the operational characteristics includes learning a plurality of user interface features that exceed a user interaction threshold;
        determine a plurality of test cases based on the operational characteristics, wherein the plurality of test cases include a test case to determine a valid range for each of a plurality of analog sensors of the fire system and a test case to test the plurality of user interface features;

execute the plurality of test cases while the fire panel device utilizes a second firmware version stored in a second portion of the memory responsive to a determination that the second firmware version has been loaded a first time from the second portion of the memory; and provide results of each of the plurality of executed test cases via an interface.

2. The fire panel device of claim 1, wherein the instructions to collect operational data associated with the fire system include instructions to collect data corresponding to each of:

applications being executed by the fire panel device;
sensing devices of the fire system; and
notification devices of the fire system.

3. The fire panel device of claim 1, including instructions to collect central processing unit (CPU) performance data and memory consumption data associated with a plurality of events during the period of time.

4. The fire panel device of claim 1, including instructions to collect data associated with usage of the fire panel by a user.

5. The fire panel device of claim 4, including instructions to collect data associated with user interactions with a user interface of the fire panel.

6. The fire panel device of claim 1, wherein the instructions to provide results of each of the plurality of executed test cases include instructions to compare the results of each of the plurality of executed test cases with an expected outcome.

7. The fire panel device of claim 1, including instructions to:

continue utilizing the second firmware version responsive to a first user input; and
roll back to the first firmware version responsive to a second user input.

8. A system for upgrading fire panel firmware using machine learning, comprising:

a plurality of event devices; and
a fire panel device comprising a processor and a memory having instructions stored thereon which, when executed by the processor, cause the processor to:
collect operational data from each of the plurality of event devices over a period of time while the fire panel device utilizes a first firmware version stored in a first portion of a memory of the fire panel device;
learn operational characteristics associated with the fire panel device while the fire panel device utilizes the first firmware version, wherein learning the operational characteristics includes learning a plurality of user interface features that exceed a user interaction threshold;
determine a plurality of test cases based on the operational characteristics, wherein the plurality of test cases include a test case to determine a valid range for each of a plurality of analog sensors of a fire system and a test case to test the plurality of user interface features;
execute the plurality of test cases while the fire panel device utilizes a second firmware version stored in a second portion of the memory of the fire panel device responsive to a determination that the second firmware version has been loaded a first time from the second portion of the memory; and
provide results of each of the plurality of executed test cases via an interface.

9. The system of claim 8, wherein the plurality of event devices includes a sounder, a flasher, and a relay output module.

10. The system of claim 8, wherein the plurality of event devices includes a fire sensor.

11. The system of claim 10, including instructions to:
collect a first set of values determined by the fire sensor while the fire panel device utilizes the first firmware version;
determine a range of the first set of collected values;
collect a second set of values determined by the fire sensor during execution of the plurality of test cases while the fire panel device utilizes the second firmware version;
determine a range of the second set of collected values; and
wherein the instructions to provide results of each of the plurality of executed test cases include instructions to provide a relationship between the range of the first set of collected values and the range of the second set of collected values.

12. A method for upgrading fire panel firmware using machine learning, comprising:

collecting operational data associated with a fire system by a fire panel device over a period of time while the fire panel device utilizes a first firmware version stored in a first portion of a memory of the fire panel device;
learning operational characteristics associated with the fire panel device utilizing the first firmware version, wherein learning the operational characteristics includes learning a plurality of user interface features that exceed a user interaction threshold;
determining a plurality of test cases for a second firmware version based on the operational characteristics, wherein the plurality of test cases include a test case to determine a valid range for each of a plurality of analog sensors of the fire system and a test case to test the plurality of user interface features;
receiving the second firmware version and storing the second firmware version in a second portion of the memory;
responsive to loading the second firmware version from the second portion of the memory a first time, executing the plurality of test cases while the fire panel device utilizes the second firmware version; and
providing results of each of the plurality of executed test cases via an interface.

13. The method of claim 12, wherein the plurality of user interface features includes:
control operations performed by a user; and
menu displays accessed by the user.

14. The method of claim 12, wherein executing the plurality of test cases includes:
simulating a plurality of events;
determining a data flow path associated with the events;
determining a deviation in the data flow path from a data flow path determined while the fire panel device utilized the first firmware version.

15. The method of claim 12, wherein providing results of each of the plurality of executed test cases includes providing an indication of a passage or a failure of each of the plurality of test cases.

16. The method of claim 12, wherein the method includes receiving the second firmware version via an external memory device.

* * * * *